Sept. 29, 1925.
N. W. LYON
1,555,507
TRANSMISSION
Filed April 12, 1923  4 Sheets-Sheet 1
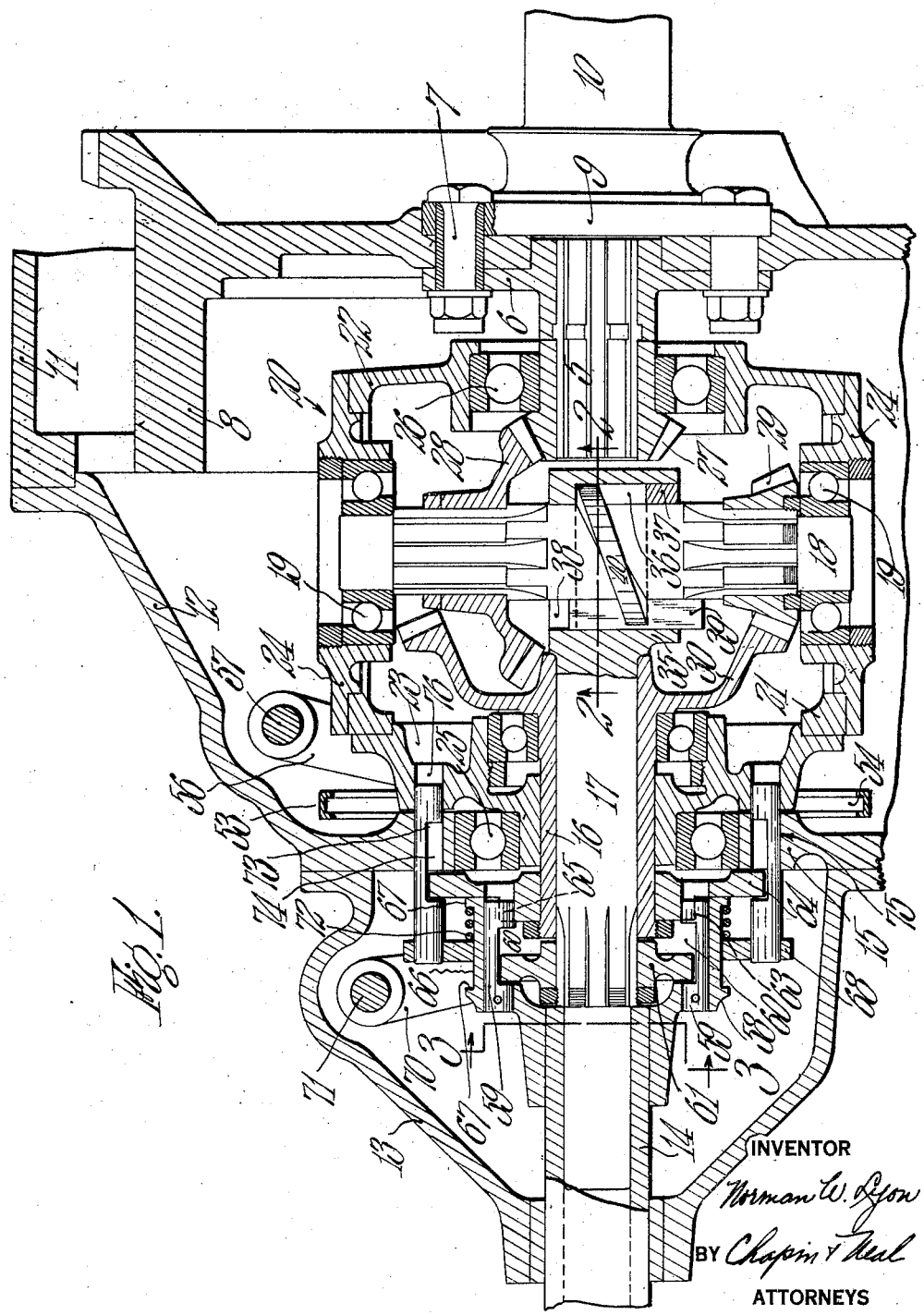
INVENTOR
Norman W. Lyon
BY Chapin & Neal
ATTORNEYS

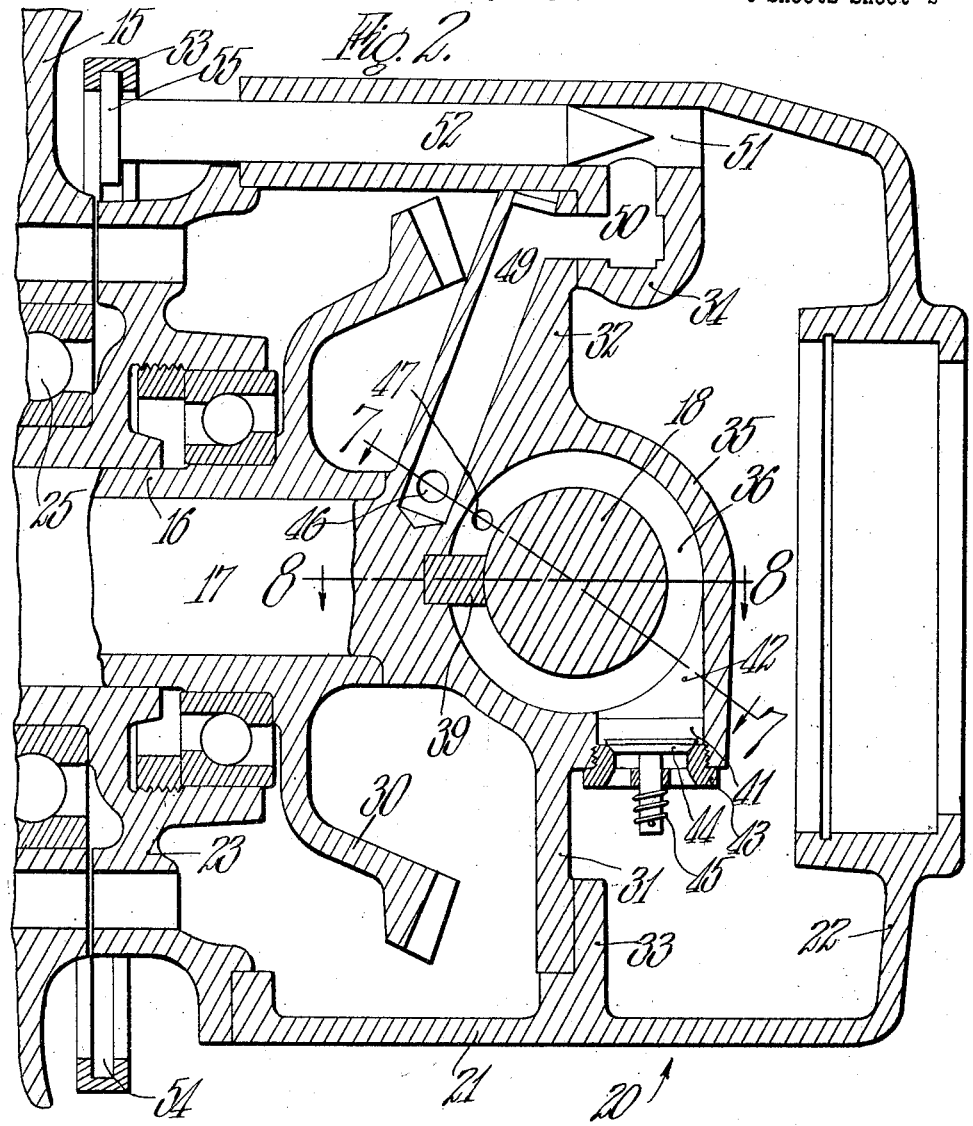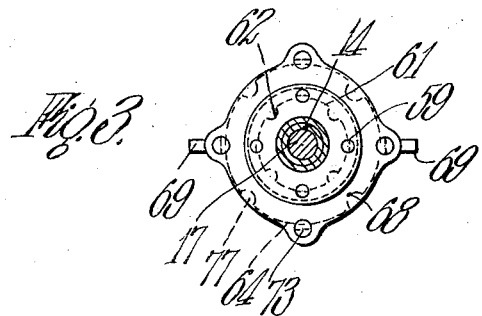

Sept. 29, 1925.
N. W. LYON
1,555,507
TRANSMISSION
Filed April 12, 1923     4 Sheets-Sheet 3
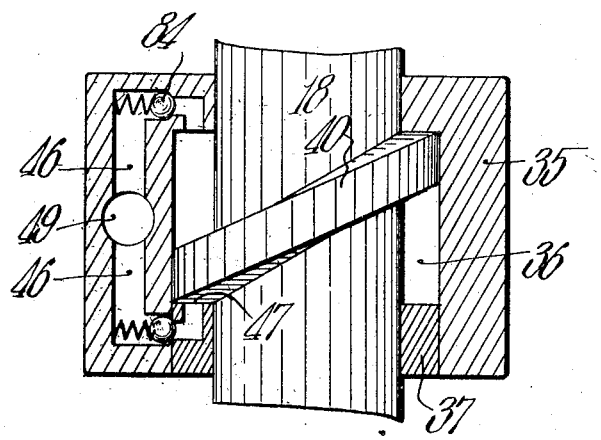
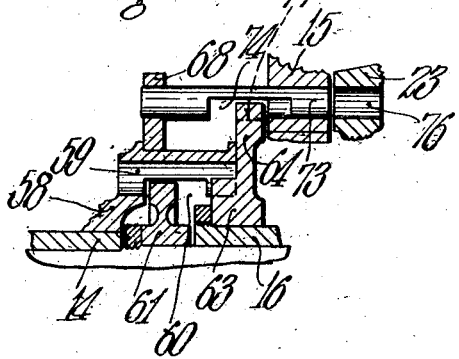
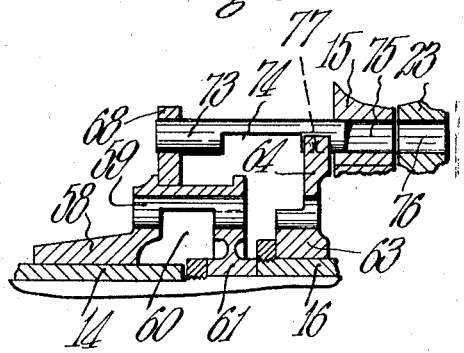
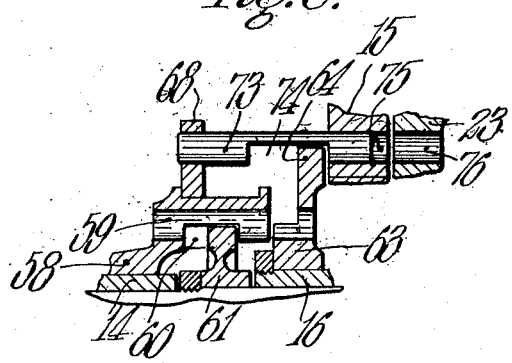
INVENTOR
Norman W. Lyon
BY Chapin & Neal
ATTORNEYS Sept. 29, 1925.
N. W. LYON
1,555,507
TRANSMISSION
Filed April 12, 1923　　4 Sheets-Sheet 4
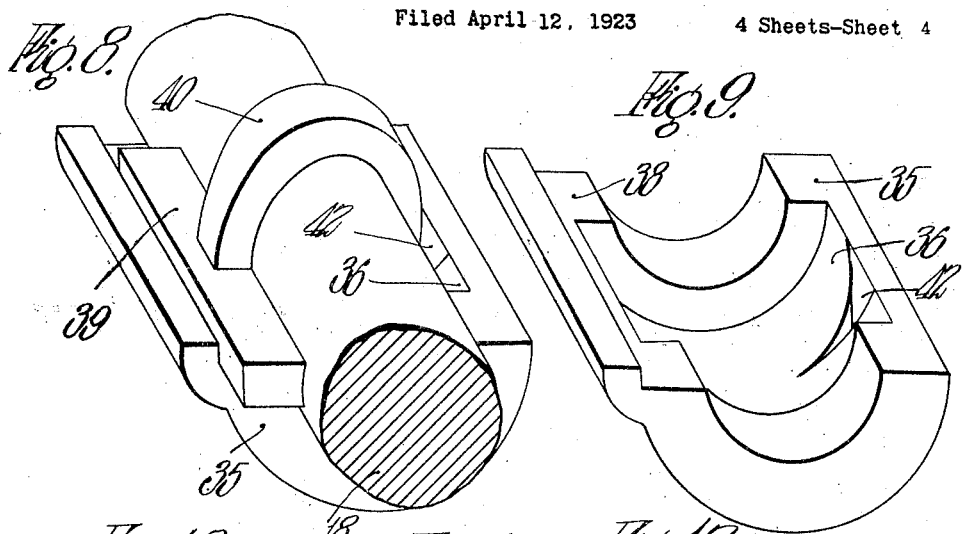
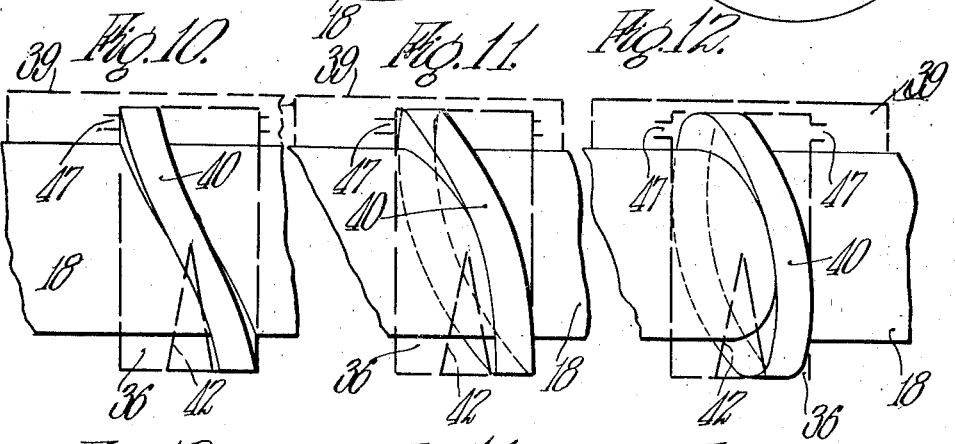
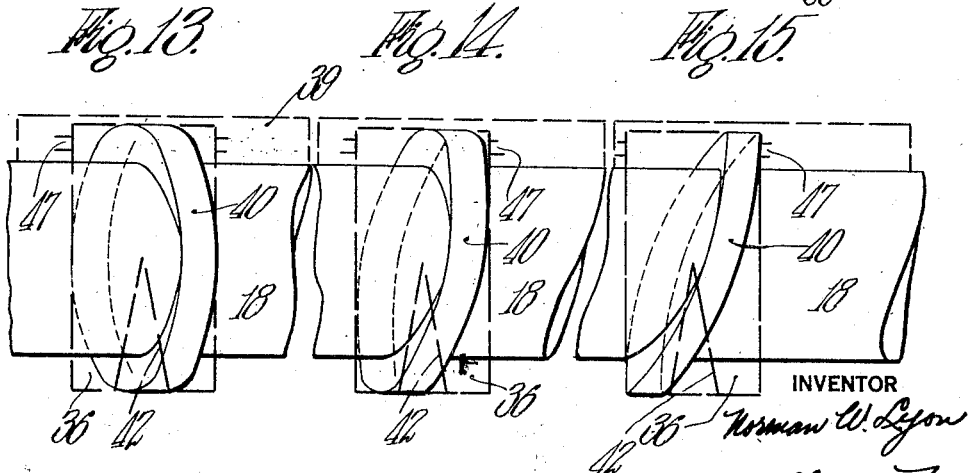
INVENTOR
Norman W. Lyon
BY Chapin & Neal
ATTORNEYS Patented Sept. 29, 1925.

1,555,507

UNITED STATES PATENT OFFICE.

NORMAN W. LYON, OF SPRINGFIELD, MASSACHUSETTS, ASSIGNOR TO EDWARD O. SUTTON, OF SPRINGFIELD, MASSACHUSETTS.

TRANSMISSION.

Application filed April 12, 1923. Serial No. 631,546.

*To all whom it may concern:*

Be it known that I, NORMAN W. LYON, a citizen of the United States, residing at Springfield, in the county of Hampden and State of Massachusetts, have invented new and useful Improvements in Transmissions, of which the following is a specification.

This invention relates to improvements in transmissions and, while the invention is capable of general application, it finds one advantageous use in connection with motor vehicles, in which low, high and intermediate speeds are required together with provisions for reverse drive.

The general object of the invention is to provide a transmission in which the gears are always in mesh and in which speed changes are effected by positively acting means; as distinguished from means which act by frictional engagement and can therefore slip.

More particularly, instead of shifting gears, for which operation the gears must be made of high grade material and carefully heat treated, one or more shiftable members of comparatively simple form, as for example cylindrical pins, are provided to take the wear and tear incident to the shifting operations. Such members are easily machined and far less expensive to manufacture than the gears and the latter, being always in mesh, need not be made as ordinarily, for heavy duty.

Another object of the invention is to provide a transmission providing for positively acting low gear and direct drive on high, together with reverse drive if desired and particularly with variable intermediate speeds between the low and high gear speeds, which intermediate speeds may be varied within the range by increments as small, as desired, to effect a gradual transition from low to high.

Another object of the invention is to effect the variable intermediate speeds by the retarding effect of a medium, such as oil, which is pumped by one of the transmission shafts through an outlet which may be closed off to various degrees to cause a pressure to be built up acting to retard the shaft.

Another object of the invention is to provide a novel means for effecting the pumping action.

Other objects and advantages will appear in the following description and in the illustrative embodiment of the invention in the accompanying drawings, in which,—

Fig. 1 is a sectional elevational view of a transmission embodying the invention;

Fig. 2 is an enlarged and fragmentary sectional view taken on the line 2—2 of Fig. 1;

Fig. 3 is a fragmentary cross-sectional view taken on the line 3—3 of Fig. 1;

Figs. 4, 5, and 6 are conventional views of the shifter and coupler devices shown in other positions than that shown in Fig. 1;

Fig. 7 is a fragmentary sectional view taken on the line 7—7 of Fig. 2 and illustrative of the pumping means;

Fig. 8 is a perspective view showing the pumping element and its casing, the upper half of the latter being cut away;

Fig. 9 is a similar view with the pumping element removed; and

Figs. 10 to 15 inclusive are conventional plan views of the pumping mechanism showing successive positions of the pumping element assumed in one-half of a revolution thereof.

Referring to these drawings, the invention has been shown in an embodiment adapted for use in motor vehicles, as an illustrative example of one preferred use, but it is, obviously, capable of other uses and the invention is independent of the particular use to which the invention is put.

In the embodiment illustrated, the driving shaft is designated 5 and is splined to the hub of a flange 6 suitably secured, as by bolts 7, to one face of a flywheel 8, to the other face of which a flange 9, fixed on the engine crankshaft 10, is secured, as by the same bolts 7. The transmission, as usual, is entirely housed in, as by the casing sections 11, 12, and 13. The section 11 may be assumed to be part of the engine crank case; the section 12 the transmission case proper; and the section 13 a supplementary casing within which is housed certain control and coupler mechanism to be hereinafter described in detail. The driven shaft, or at least that portion of it illustrated herein, consists of a sleeve 14, which has a bearing in the outer end wall of casing section 13 and enters into the interior of the latter,— terminating in spaced relation with the end face 15 of the casing section 12. Intermediate the driving and driven shafts and axially aligned therewith, is a sleeve 16, which, as will appear, is rotatably supported in the end wall 15. Rotatably mounted within sleeve 16 is a shaft 17 which at its outer end is shouldered down to fit in the adjacent end of the hollow driving shaft 14.

The lay shaft of the transmission is shown at 18 and is arranged between the ends of the driving and driven shafts with its axis disposed in non-parallel relation therewith. Conveniently, although not necessarily, the axis of lay shaft 18 is, as shown, disposed at right angles to the common axis of the driving and driven shafts. Lay shaft 18 is rotatably supported at its ends, as by ball bearings 19, in a cage 20, of approximately cylindrical form, and extends diametrically through the cage. As shown, this cage includes a cylindrical shell-like portion 21 with an integral end wall 22 and a removable end wall 23. Preferably, it also includes diametrically opposed flanges 24 removably secured to the shell-like portion 21,—these flanges serving to receive the ball bearings 19, above described. The cage 20 is mounted to rotate about the common axis of the driving and driven shafts. As shown, the end wall 23 is rotatably mounted on sleeve 16 and a ball bearing 25 rotatably supports it in from the above described end wall 15 of casing section 12. The other end wall 22 of cage 20 is rotatably supported, through the intermediary of a ball bearing 26, from the hub of a bevel pinion 27, which, as indicated, is splined to the driving shaft 5.

The driving pinion 27 meshes with a larger bevel gear 28, which is splined to the lay shaft 18 near one end thereof. Splined to the latter, near its other end, is a small bevel pinion 29 which meshes with a very much larger bevel gear 30, formed as an integral part of the sleeve 16, above described. The arrangement is such as to effect a considerable speed reduction when shaft 16 is driven from shaft 5 through the intermediary of the gears 27, 28, 29, and 30.

The shaft 17 is suitably fixed at its inner end to cage 20 to rotate therewith. Referring to Fig. 2, shaft 17 is provided with oppositely extending feet 31 and 32 which are suitably fixed to flanges 33 and 34 respectively, formed on the inner periphery of the section 21 of cage 20. Shaft 17 is also provided at its inner end with a central substantially cylindrical portion 35 which encompasses the lay shaft 18 and closely fits the latter near one end only. The remainder of portion 35 is counterbored to provide an annular chamber 36 surrounding shaft 17,— a plug 37 being provided at the other end of portion 35 to close the otherwise open end of chamber 36. The portion 35 is also provided with a key way 38 to receive an axially slidable key 39, the function of which is to partition the annular chamber and allow a pumping action to take place therein. This pumping action is accomplished by a ring piston 40, which is fixed to, or integral with shaft 18, encompassing the latter in such fashion as to lie diagonally in chamber 36, with the inner periphery of which the outer periphery of ring 40 is engaged. One extremity of ring 40 always contacts with one end wall of chamber 36 and the other extremity always contacts with the other end wall. The sliding key 39 is notched to fit over ring 40 and freely fit the same so that the ring can rotate and, as it does so, the key 39 can slide back and forth, keeping chamber 36 always partitioned. The construction of the ring piston is clearly illustrated in Figs. 8, and 10 to 15 inclusive,—Figs. 10 to 15 showing various positions which the piston assumes during one-half a revolution of shaft 18.

Referring to Fig. 2, there is a single central inlet to chamber 36 which is disposed near the base thereof and through which oil may be drawn from the interior of cage 20,—oil likewise entering the latter, if necessary, from the transmission casing through the various ball bearings described, or being otherwise supplied thereto, as desired. A vertically disposed cylindrical passage 41 is bored from the outside of portion 35 toward chamber 36 and communicates with the latter through a substantially triangular passage 42 (best shown in Fig. 9) with which it intersects. Threaded into passage 41 is a spider 43 in which a valve 44 is slidingly mounted such valve cooperating with a suitable seat on the spider to close the inlet passage 41. A spring 45 normally holds valve 44 to its seat but it may be drawn upwardly by suction to open passage 41.

Referring next to Fig. 7, there are two outlet passages 46, each communicating with chamber 36 through ports 47 disposed one in each end wall of the chamber in opposed relation. In each passage 46, a check valve 48 is preferably provided, such as the spring pressed balls shown herein, these valves opening to permit outward passage of oil from chamber 36 but preventing return flow. Both passages intersect with a central common passage 49, which, as shown in Fig. 2, extends outwardly through one of the feet 32 and communicates with a passage 50 formed in flange 34 of cage 20. Intersecting with passage 50 is a passage 51 disposed parallel to the axis of shaft 17 and opening at one end into the interior of cage 20. Slidably mounted in passage 51 and extending outwardly from the other end thereof is a needle valve 52, by means of which the communication between passages 50 and 51, and thus the outlet of the pump above described, can be entirely shut off or opened to a greater or less degree in a regulable manner.

Any suitable means for operating the needle valve 52 may be provided, and I have shown as an example an annular ring 53 having an internal groove 54 in which a head 55 on valve 52 is slidingly engaged. Ring 53, like any other shifter ring, may be carried and moved by a pair of shifter arms 56, one of which is shown in Fig. 1, such arms being fixed to a rock shaft 57 which extends outside the transmission casing and may be operated by any suitable control device (not shown).

Referring to Figs. 10 to 15, there is space of constant volume between each side face of the ring piston and the adjacent end wall of chamber 36 and each of such spaces, if developed, would have the shape of an isosceles triangle. This triangular space may be considered as revolving and, except when the piston is in one position, that space will be divided by the key 39. Therefore, if one of the spaces is filled with oil, that oil cannot pass key 39 but must leave through one of the outlet ports 47. The tip end of the triangular space, as it passes by the key 39, is free of oil and, on continued travel, a partial vacuum is created in that much of the space which lies beyond the key in the direction of rotation of the piston. This portion of the space becomes greater and greater and eventually the ring piston uncovers the inlet port 42 whereby, due to the partial vacuum already created, valve 44 is lifted and oil rushes in to fill the space. Continued rotation of the piston eventually cuts off communication with the inlet valve and the oil is carried around until it strikes the key 39, where, being unable to travel further, it is forced out through an outlet port 47. In Fig. 10, that space to the left of piston 40 has been in full communication with the inlet port and such communication is beginning to be cut off. That space to the right of piston 40 is entirely cut off from inlet port 42 and divided centrally by key 39. In the leading end of right hand space a partial vacuum has been created while the trailing end is still discharging oil through the outlet port 48. The views show consecutive stages of action, the inlet port 42 being nearly cut off from communication with the left hand space in Fig. 11 and entirely cut off in Fig. 12. Communication with such port and the right hand space is partially established in Fig. 12 and entirely established in Fig. 13. Oil is beginning to discharge from the left hand space in Fig. 12 and continues to discharge from such space in the remaining figures being shown midway in the discharge cycle in Fig. 15. The operation of the pump has been traced for only one-half of the revolution of its piston but enough has been illustrated and described to readily enable one to understand how the pump operates. The pump is double acting and one-half of each action has been traced, these two halves being the dissimilar ones and together serving to show one complete cycle of operation.

The pump just described, together with its regulable outlet, serves as one part of the control mechanism of the transmission. By closing off its outlet sufficiently a pressure can be built up by the pump such as to hold the lay shaft 18 against revolution about its own axis. By opening the outlet, the pressure built up by the pump can be lessened, as desired, to allow the lay shaft to turn about its own axis with various degrees of freedom and therefore at various speeds and by opening the outlet entirely, no substantial retarding pressure is created and the lay shaft can turn freely.

There are other control devices which will now be described with particular reference to Fig. 1. The driven shaft 14 has slidingly keyed thereto a flange 58 to which are fixed, at a plurality of circumferentially spaced points, a series, as four, of pins 59, each of which intermediate its ends is recessed, as at 60, leaving the central portions of the pins with a substantially semi-circular cross-sectional shape. Adjacent flange 58, and fixed to the cage shaft 17, is a flange 61 and the recesses 60 in pins 59 may, as shown, overlie the outer periphery of this flange. In the latter are a series of recesses and, as shown in Fig. 3, these recesses are semi-circular and correspond with the spacing of pins 59. The flange 58 may, as will appear, be moved to the left (as viewed in Fig. 1) sufficiently to bring the remote ends of pins 59, which are of cylindrical form, into these recesses to thereby lock flanges 58 and 61 together, whereby the cage shaft 17 may be locked to the driven shaft.

Beyond flange 61 and fixed to the sleeve 16, which as described is integral with the large bevel gear 30, is a stepped flange having two peripheral portions 63 and 64 of different diameter. The portion 63 is of the same diameter as flange 61, and, like the latter, is provided with the same number and kind of recesses 65, similarly spaced. As shown, the remote ends of pins 59 are engaged in recesses 65, whereby flanges 58 and 63 are locked together so that sleeve 16 is coupled to the driven shaft 14. When flange 58 is moved to the left, as described, the cylindrical ends of pins 59 are withdrawn from recesses 65 and, as shown in Fig. 5, the recesses 60 in pins 59 are long enough so that flange 63 may be entirely uncoupled from flange 58 prior to the coupling of the latter to flange 61, which action occurs on further movement of flange 58 to the left into the position shown in Fig. 7.

The flange 58 has a cylindrical portion 66 which overlies pins 59 and is provided at each end with flanges 67. Slidably mounted on such portion is a ring 68, which, as shown in Fig. 3, has at diametrically opposite points studs 69 adapted to be engaged by shifter arms 70, one of which is shown in Fig. 1. These arms 70 are fixed on a rock shaft 71 which extends outside the transmission casing for operation by any suitable control device, whereby flange 68 may be moved in an axial direction. Flange 68 is freely slidable on portion 66 and to keep the latter and flange 58 in proper axial position, a spring 72 is provided, which encompasses portion 66 and acts between shifter ring 68 and the right hand end flange 67 to force the latter to the right (as viewed in Fig. 1), such movement being limited by the abutment of an end face of portion 66 with the flange 64. The ring 68 when moved to the right does not cause movement of flange 58 until it abuts with the other end flange 67, whereupon flange 58 is moved to effect the operations described.

The flange 68 carries a series, as four, of cylindrical pins 73, which parallel the pins 59 and, like the latter, are recessed, as at 74. These pins, as shown, are also engaged in holes 75 provided through the end wall 15 of casing section 12 and may extend through and beyond such wall to engage in holes 76 formed in the end wall 23 of cage 20. When thus positioned, they serve to lock the cage against rotation and the recesses 74 overlie the periphery of flange 64 and permit it to rotate. Flange 64, like the flanges 61 and 63, is provided with a series of recesses 77 in its periphery with which the cylindrical portions of pins 73 may be engaged. Thus, on moving pins 73 to the left from the position shown in Fig. 1, they are first completely withdrawn from cage 20 without becoming engaged in recesses 77 (see Fig. 4) and are finally engaged in these recesses without withdrawing pins 73 from holes 75, whereby flange 64 and thus the large bevel gear 30 is locked to the casing and against rotation.

The operation of the transmission will next be described. This operation is effected through the rocking of shafts 57 and 71 and, of course, through any suitable form of clutch (not shown) which can be opened during the shifting operations in the usual manner. To effect a low gear transmission between the driving and driven elements, the parts are positioned as shown in Fig. 1. The shifter arms 56 are moved to the left, as illustrated, to cause needle valve 52 to fully open the communication between passages 50 and 51. The shifter arms 70 are moved to their extreme right hand positions, whereby cage 20 is locked against rotation by the pins 73 which couple it to the end wall 15 of casing 12. At the same time flange 64 and thus bevel gear 30 is free to rotate and flange 63,—an integral part of flange 64, is coupled to the sliding flange 58 on the driven shaft 14, without, however, interfering with flange 61, which being fast to shaft 17 and thus to cage 20, must remain stationary. The transmission is then as follows:—shaft 5 drives lay shaft 18 at a lower speed through gears 27 and 28 and shaft 18 drives sleeve 16 at a still lower speed through gears 29 and 30. The sleeve 16 being fixed to flange 63 is connected to flange 58 and thus turns the driven shaft 14. The latter turns in the same direction as the driving shaft 5.

The next step is effected by moving shifter ring 68 to the left until it abuts the left hand flange 67. This results in withdrawing pins 73 from cage 20 and freeing the latter for rotation, as illustrated in Fig. 4. The sleeve 16, however, is still free to rotate and is coupled in the same manner to the drive shaft. The shifter arms 56 are also moved to the right to close off the communication between passages 50 and 51, first, partially and gradually and, finally, entirely so, or as nearly so as is required to hold lay shaft 18 against revolution about its own axis. When shaft 18 is thus held, the pairs of gears are locked together and cage 20 rotates, the shaft 5 being coupled to sleeve 16 to turn the latter, and thus drive shaft 14, in the same direction and at equal speed. This gives a direct drive for high speed but any desired intermediate speeds, and graded speed changes by as small increments as is desired, may be effected by manipulation of valve 52. That is, the lay shaft 18 may not be firmly held against rotation but may be allowed to rotate at various speeds within its range. When this happens, cage 20 and bevel gear 30 no longer rotate at equal speeds but slippage in the drive to gear 30 occurs whereby it may rotate at various speeds less than that of shaft 5 and may even come to rest if no retarding influence is exerted on shaft 18.

For reverse gear operation, the shifter arms 56 are so manipulated that passages 50 and 51 are in full communication, just as they were for low gear operation, and shifter arms 70 are moved still further to the left. The latter then move flange 58 by abutment with its left hand end flange 67 and the first operation is to uncouple sleeve 16 from driven shaft 14 by withdrawing pins 59 from flange 63, which condition is shown in Fig. 5. The recesses 60 and 74 should be long enough to permit this uncoupling without causing pins 59 and 73 to engage flanges 61 and 64, respectively, thus leaving the parts entirely free and in neutral. Continued movement of ring 68 beyond the neutral position, just described, carries pins 73 to the left sufficiently to engage in the recesses 77 in flange 64 and thereby lock the latter to the casing, whereby bevel gear 30 is held against rotation. At the same time pins 59 are engaged in the notches 62 of flange 61 whereby shaft 17, and thus cage 20, are connected to the driven shaft 14. Then shaft 5 drives lay shaft 18, as before, but bevel pinion 29 cannot turn bevel gear 30 and is forced to travel around it, thereby moving cage 20, and with it shafts 17 and 14, in a direction reverse to that of shaft 5.

According to some features of the invention, the reverse gear may be omitted leaving an operable transmission for low, high and intermediate speeds. In such case, the sleeve 16 always remains coupled with the driven shaft 14 and may properly be considered as a part thereof,—the connecting parts, comprising the flanges 58 and 63 and pins 59, even being replaced by other and simpler connections if desired.

The transmission mechanism described is, according to some features of the invention, independent of the particular means for retarding or entirely holding the lay shaft 18 to effect intermediate speeds and high speeds and, while the particular means illustrated,—the oil pump with regulable discharge,—is important and preferred, various other expedients may be used for accomplishing the same purpose as will readily occur to those skilled in the art. Likewise, according to other features of the invention, the oil pump arrangement is independent of the particular transmission structure with which it is employed and may be otherwise employed as desired.

The invention has been disclosed herein, in an embodiment at present preferred, for illustrative purposes but the scope of the invention is defined by the appended claims rather than by the foregoing description.

Claims:

1. A transmission, comprising in combination, driving and driven shafts, a pair of intermediate shafts disposed in concentric relation, means for coupling one end of either intermediate shaft to the driven shaft, a rotatable cage supported by the driving shaft and by the other end of one of said intermediate shafts, the other end of the other intermediate shaft having a part extending substantially into the center of said cage and secured thereto, a lay shaft mounted in said cage and extending across the latter and through said part, and gearing between the driving and lay shafts and between the lay shaft and the first named intermediate shaft.

2. A transmission, comprising in combination, driving and driven shafts, a pair of intermediate shafts, means for coupling one end of either of the latter to the driven shaft, a rotatable cage supported at one side by the driving shaft and at the other side by the other end of one of said intermediate shafts, the other end of the other intermediate shaft extending substantially into the center of said cage and carrying a pump cylinder, a lay shaft mounted in said cage and passing through said cylinder, a piston on the lay shaft, and gearing to connect the latter to the driving shaft and to the first named intermediate shaft.

3. A transmission, comprising in combination, driving and driven shafts, a pair of intermediate shafts, means for coupling one end of either of the latter to the driven shaft, a rotatable cage supported at one side by the driving shaft and at the other side by the other end of one of said intermediate shafts, the other end of the other intermediate shaft extending substantially into the center of said cage and carrying a pump cylinder and a flange, the latter being secured to said cage, a lay shaft mounted in said cage and passing through said cylinder, a piston on the lay shaft, an outlet passage for said cylinder formed in said flange, and gearing to connect the latter to the driving shaft and to the first named intermediate shaft.

4. A transmission, comprising in combination, a stationary casing carrying oil for lubricating the moving parts of the transmission, driving and driven shafts, a lay shaft, a rotatable frame within the casing in which the lay shaft is mounted for rotation about its own axis, gearing between the driving and lay shafts and between the driven and lay shafts, an inner casing fixed to said frame through which said lay shaft extends, an element rotatable by the lay shaft within said inner casing and capable of cooperating therewith to pump oil from the first named casing and discharge it thereto, and means for controlling the discharge of pumped oil from the inner casing to retard the rotation of the lay shaft about its own aixs.

5. A transmission, comprising, driving and driven elements mounted in axially spaced relation and with their axes in alignment, a cage adapted to contain oil and spanning the spaced ends of said elements about the common axis of which the cage is rotatable, a lay shaft carried by the cage and rotatable about its own axis and disposed intermediate the spaced ends of said elements with its axis at an angle to that of the latter, gearing connecting the driving and lay shafts, gearing connecting the driven and lay shafts, an inner casing fixed to said cage and through which said lay shaft extends, an inlet provided to said inner casing from said cage, a regulable outlet provided from said inner casing, an element cooperating with said inner casing to draw oil from the cage and force it through said regulable outlet, and means including parts not rotatable with the cage for controlling said outlet.

6. A transmission, comprising in combination, driving and driven shafts mounted in alinement, intermediate shafts disposed one within the other in concentric relation and in line with the driving and driven shafts, means for coupling either of the intermediate shafts to the driven shaft, a frame mounted for rotation about the alined axes of said shafts, a lay shaft rotatably mounted in said frame, gearing connecting the driving and lay shafts, gearing connecting the lay shaft to one of said intermediate shafts, the other of the last named shafts being connected for rotation with said frame, and means to hold either one of said intermediate shafts against rotation when desired, said means being operable to cause the other of said intermediate shafts to be coupled to the driven member.

7. A transmission, comprising in combination, driving and driven shafts mounted in alinement, intermediate shafts disposed one within the other in concentric relation and in line with the driving and driven shafts, means for coupling either of the intermediate shafts to the driven shaft, a frame mounted for rotation about the alined axes of said shafts, a lay shaft rotatably mounted in said frame, gearing connecting the driving and lay shafts, gearing connecting the lay shaft to one of said intermediate shafts, the other of the last named shafts being connected for rotation with said frame, and means to hold either one of said intermediate shafts against rotation when desired, said means operable to cause such intermediate shaft to be first uncoupled from the driven shaft and to cause the other of said intermediate shafts to be coupled thereto.

8. A transmission, comprising in combination, driving and driven shafts mounted in alinement, intermediate shafts disposed one within the other in concentric relation and in line with the driving and driven shafts, means for coupling either of the intermediate shafts to the driven shaft, a frame mounted for rotation about the alined axes of said shafts, a lay shaft rotatably mounted in said frame, gearing connecting the driving and lay shafts, gearing connecting the lay shaft to one of said intermediate shafts, the other of the last named shafts being connected for rotation with said frame, means to hold either one of said intermediate shafts against rotation when desired, and means for retarding the rotation of said lay shaft while said frame is free for rotation.

In testimony whereof I have affixed my signature.

NORMAN W. LYON.